US007099847B2

(12) United States Patent
Darling (10) Patent No.: US 7,099,847 B2
(45) Date of Patent: Aug. 29, 2006

(54) APPARATUS, METHODS AND ARTICLES OF MANUFACTURE FOR CONSTRUCTION AND MAINTAINING A CALENDARING INTERFACE

(75) Inventor: Anne Marie Darling, Jersey City, NJ (US)

(73) Assignee: Goldman Sachs & Co., New York, NY (US)

( * ) Notice: Subject to any disclaimer, the term of this patent is extended or adjusted under 35 U.S.C. 154(b) by 634 days.

(21) Appl. No.: 10/016,289

(22) Filed: Oct. 31, 2001

(65) Prior Publication Data

US 2002/0138436 A1   Sep. 26, 2002

Related U.S. Application Data

(63) Continuation-in-part of application No. 09/796,570, filed on Feb. 28, 2001.

(51) Int. Cl.
*G06Q 99/00* (2006.01)
*H04K 1/00* (2006.01)
*H04L 9/00* (2006.01)
*G06F 17/30* (2006.01)

(52) U.S. Cl. .................. 705/51; 707/1; 707/6; 707/10; 707/103; 707/104; 345/329; 345/731

(58) Field of Classification Search .................. 705/51, 705/1; 707/103, 517, 104, 102, 501.1, 530, 707/1, 6, 10; 709/205, 203, 217, 219; 715/513; 345/329, 731

See application file for complete search history.

(56) References Cited

U.S. PATENT DOCUMENTS 5,806,071 A  * 9/1998 Balderrama et al. ....... 707/104.1
5,852,435 A  * 12/1998 Vigneaux et al. ........... 345/428
5,999,911 A  * 12/1999 Berg et al. ....................... 705/9
6,026,417 A  * 2/2000 Ross et al. .................. 715/517
6,038,573 A  * 3/2000 Parks ........................... 715/513
6,088,702 A  * 7/2000 Plantz et al. ............ 707/103 R
6,170,002 B1 * 1/2001 Ouchi ......................... 709/206
6,185,587 B1 * 2/2001 Bernardo et al. ........... 715/513
6,263,352 B1 * 7/2001 Cohen ......................... 715/513
6,304,886 B1 * 10/2001 Bernardo et al. ........... 715/530
6,308,188 B1 * 10/2001 Bernardo et al. ........... 715/530
6,393,456 B1 * 5/2002 Ambler et al. .............. 709/200
6,484,149 B1 * 11/2002 Jammes et al. ............... 705/26
6,643,663 B1 * 11/2003 Dabney et al. ............. 707/102

FOREIGN PATENT DOCUMENTS

WO    WO 00/65463 A1 *  2/2000

OTHER PUBLICATIONS

How technical editors enrich the revision process. Gerich, Carol, Technical Communication, vol. 41, No. 1, p. 59 (12), Feb. 1994.*

* cited by examiner

*Primary Examiner*—James P. Trammell
*Assistant Examiner*—Daniel L. Greene
(74) *Attorney, Agent, or Firm*—Bucklely, Maschoff & Talwalkar LLC (57) ABSTRACT

The present invention comprises apparatus, methods and articles of manufacture for providing, accessing and editing content intended for publication or dissemination. A client-server architecture is provided in the preferred embodiments which provides User Types (Internal Users and External Users) with various Content Types and Content Subtypes through various dissemination channels. The User Types provide, access and edit the Content Types. In the preferred embodiments, the Internal User User Type provides almost all the Content Types, with limited contributions by External User User Types. User Types comprise Content Providers, Content Reviewers, Editors, Approvers, and possibly others.

9 Claims, 10 Drawing Sheets

APPARATUS, METHODS AND ARTICLES OF MANUFACTURE FOR CONSTRUCTION AND MAINTAINING A CALENDARING INTERFACE

CROSS-REFERENCE TO RELATED APPLICATIONS

This application is a continuation-in-part of co-pending application U.S. application Ser. No. 09/796,570 entitled "COMPUTERIZED INTERFACE FOR MONITORING FINANCIAL INFORMATION AND EXECUTING FINANCIAL TRANSACTIONS", filed on Feb. 28, 2001 by Brian S. Brittingham and Thomas Jessop.

FIELD OF THE INVENTION

The present invention relates to apparatus, methods and articles of manufacture for providing, editing and accessing content. More specifically, the present invention relates to improvements in interface apparatus, methods, and articles of manufacture for providing, editing and accessing content within a networked environment.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Providing, editing and accessing content is a challenging task because multiple authors, reviewers, editors, readers and others need to have their efforts coordinated among multiple article items. For example, each author may need to access and re-access his or her own content, reviewers and editors may need to contact the author or each other once the author is finished with his or her content, readers and others may need to be able to access the content quickly, etc.

Providing, editing and accessing content is even more challenging in a networked computer environment because of the complexity imposed by the environment. For example, each person needing to provide, edit or access the content may use different systems in different ways to accomplish their task, one person may not be able to reach another because of network incompatibilities or difficulties, the content must be monitored to ensure it is proceeding through any editing process properly, etc.

Some systems do exist that may accomplish at least some of these tasks. The systems that may exist, however, may not accomplish them as efficiently as desirable and may not provide any ability to provide, edit or access content quickly. That is, commercial publication systems operate on a relatively static schedule, for example, a monthly, weekly or daily schedule. However, if the ability to constantly and rapidly publish content to a number of outlets, e.g., a web site, email, instant messaging, etc., is desired, existing systems may be simply overwhelmed.

Moreover, existing systems may be tailored for industry professionals, that is for professional authors, editors, etc. Therefore the systems may require some specialized ability or training for the particular system. However, a casual user may be baffled by these systems, and so may need a system that is simple and convenient to use.

Besides the above mentioned challenges, content provision, editing or accessing may need to meet other challenges in specialized environments. For example, one of those specialized environments is the financial industry, which requires certain controls on content. For example, content generated by a financial institution usually must be reviewed carefully for compliance with various security laws before being approved for dissemination. Yet the compliance or approval process cannot interfere with the publication process because of the need for speed—a financial institution must provide timely information to its customers.

Therefore, it is an object of the present invention to provide methods, apparatus and articles of manufacture for providing, editing and accessing content.

It is a further object of the present invention to provide methods, apparatus and articles of manufacture for providing, editing and accessing content in a networked environment.

It is a further object of the present invention to provide methods, apparatus and articles of manufacture for conveniently providing, editing and accessing content in a networked environment.

It is a further object of the present invention to provide methods, apparatus and articles of manufacture for timely providing, editing and accessing content in a networked environment.

SUMMARY OF THE INVENTION

The present invention provides apparatus, methods and articles of manufacture for providing, accessing and editing content intended for publication or dissemination. Various User Types, such as Internal Users and External Users, provide various Content Types and Content Subtypes through various dissemination channels, e.g., Website Content Type is published on a Website as a Website document, Email Content Type is disseminated through email, etc.

The User Types provide, access and edit the Content Types. In the preferred embodiments, the Internal User User Type provides almost all the Content Types, with limited contributions by External User User Types. User Types comprise Content Providers, Content Reviewers, Editors, Approvers, and possibly others.

The workflow of any particular Article ("Article" is used herein to identify a particular Content Type, i.e., one being provided, accessed or edited) through any particular User Type depends upon the Content Type of that Article. For example, an email may only proceed from Content Provider to Approver before being disseminated. In contrast, a Website document may proceed from a Content Provider, to a Reviewer, to an Editor, to an Approver, before being published.

Content Providers supply their content through Content Type Templates, which assure a consistent appearance among Articles of each Content Type. Content Type Templates are specifically formatted for each Content Type, that is, a Website Document Template exists, an Email Template exists, etc. User access to Content Type Templates is usually restricted. A user typically does not have access to all Content Type Templates, e.g., not all users may create Website documents because they do not have access to Website Document Templates, etc.

After the user completes the Article using the appropriate template, the Article is routed to various Content Editors, which is a term used herein for any entity in a non-creator role and comprises one or more Reviewers, Editors and Approvers. The Article may be released for publication, disseminated by email, etc. Alternatively, the Article may be returned to the Content Provider if a decision not to publish is made.

Tagging of content, whether automatic or manual, provides for tracking and appropriate dissemination. For example, a stock mentioned in any content may be tagged automatically by the system, thus ensuring parties interested in that stock are kept appraised of all Articles regarding that stock.

The status of the Article as it passes through the system is continually monitored and the users are appraised of the status of the Article as the Article proceeds from user to user. Email notification may automatically notify the User if desired. Electronic routing between users further controls workflow and facilitates rapid time-to-publish. In some embodiments, multiple workflows are possible. More than one Content Provider may be contributing content sections to a Website document, more than one sections may be edited, etc. This dynamic workflow is tracked as the Article proceeds through the system. The system also provides for convenient retrieval, removal and replacement of content as desired.

In the especially preferred embodiments, user input occurs within a client-server system, using a graphic user interface. Components are constructed in Java® and XML and HTTP is used as the data transfer protocol.

DETAILED DESCRIPTION OF THE PREFERRED EMBODIMENTS

Figure 1:
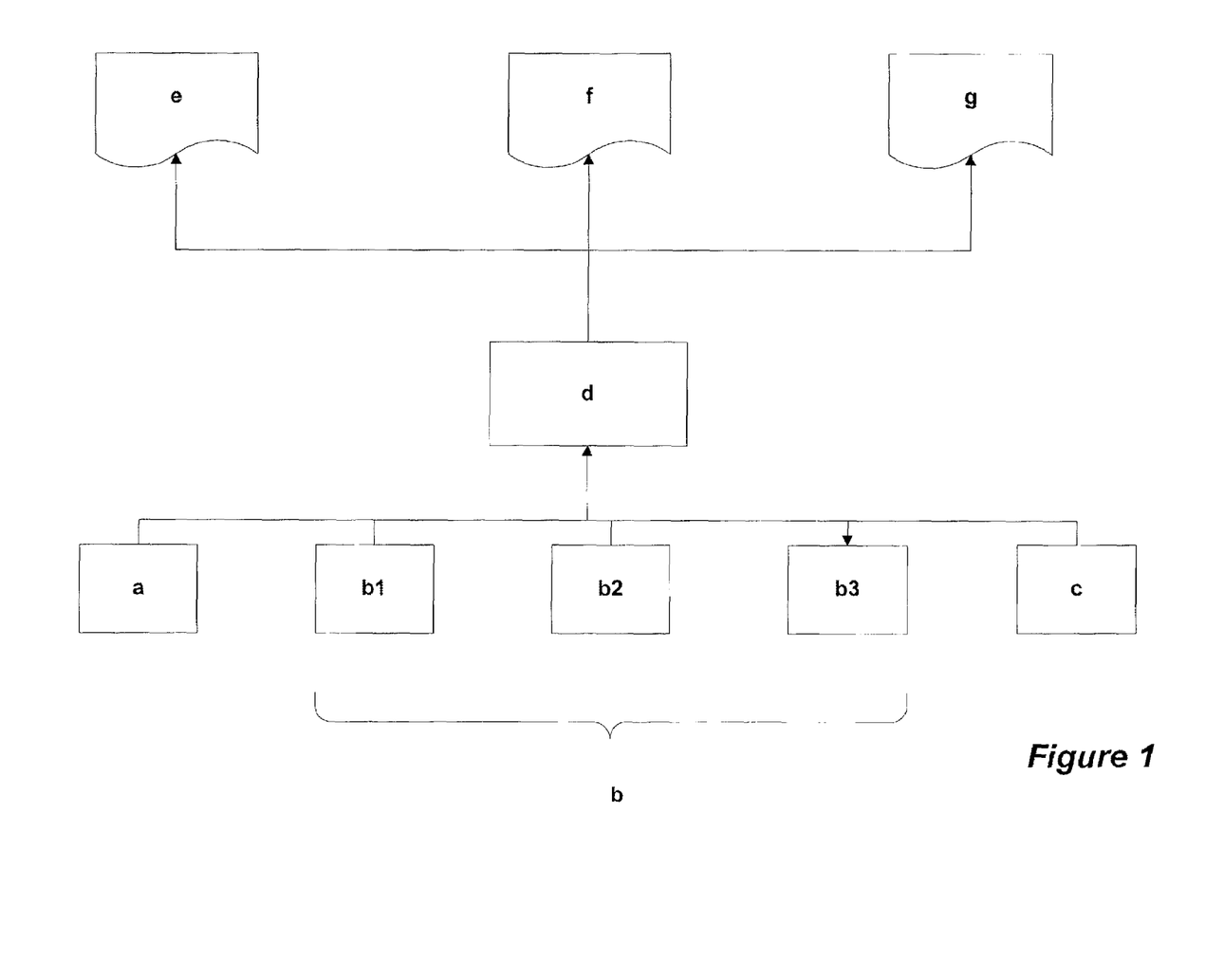
FIG. 1 shows a schematic diagram of a preferred embodiment.

FIG. 1 shows a schematic view of a preferred embodiment. There are two general user types: 1) Internal Users, shown generally at a and b; and, 2) External Users shown generally at c. Internal Users are, in this embodiment, users within the system that have been preapproved to provide, access and/or edit content intended for publication or dissemination. External Users are those outside the system, i.e., who have not been preapproved to provide, access and/or edit content intended for publication or dissemination.

Internal User Types also have Subtypes. In this embodiment there are two Subtypes, which are; a) Content Providers, and, b) Content Editors. The Content Editor Subtype is further comprised of Reviewers, Editors and Approvers.

The Content Provider is an Author or Authors shown generally at a. ("Author" in singular or plural is used herein synonymously with "creator" and "content provider," singular or plural.) More than one Author may work on specific Article content simultaneously, as will be described further below. Shown at b are the Content Editors, (which is a term used herein for any entity in a non-creator role.) In this embodiment Content Editors comprise three User Subtypes; 1) one or more Reviewers b1, 2) one or more Editors b2, and 3) one or more Approvers b3. More than one Content Editor may work on specific Article content simultaneously, as will be described further below.

Shown at c are External Users, which primarily comprise Reviewers. Generally, External Users do not receive content without that content being targeted, that is External Users only receive content specifically targeted for that External User. More than one External User may work on content simultaneously, as will be described further below. Simultaneous processing of content provides for dynamic content management, again as described in further detail below.

Authors a, Content Editors b and External Users c have access to Application Server d through a client, terminal, or other method as described further below. Application Server d will, as will be described further below, provide processing of content prior to publication or dissemination to Website e, Email f or Alert g.

It should be noted that the description of the embodiments herein primarily uses Web terminology. However, it should be specifically understood that embodiments can be implemented in environments that support GUI and other interfaces, including but not limited to Microsoft Windows® NT, Windows® 2000, Windows 95, 98 and Me, Unix® and Unix-like platforms, including but not limited to Linux® and its variants, as well as other operating system platforms including but not limited to IBM OS/390, MacOS, VxWorks® and others.

The Internal User, whether Author, Editor or other, is provided with controlled access to the Server depending on User Type and Content Type. A User Type Author has access to the content he is providing. A User Type Content Editor usually has broader access privileges. User Types generally do not have Content Access if the Content is ahead of the User, that is, if the Content has been passed further along the workflow from the User. Of course, this may be modified by one person being multiple User types, as is described further below; by multiple Editing sessions, as is described further below, etc.

Content Type also determines User access, with Authors generally being provided access to archived materials that they or another may have worked on, and Reviewers, Editors and Approvers generally having access determined by the time sensitivity of the content and their level of expertise. The more time sensitive, the less Reviewer, Editor and Approver access to the content. However, more senior Reviewers, Editors and Approvers are permitted broader access, assuming time constraints are met.

External User access is limited to the addition of Comments when requested by an Internal User. Comments may be any type of information, but are usually simple expositions. For example, an External User who is a specialist in a particular stock may be requested for comments on an Article about that stock. The External Users comments are logged, so as to maintain tracking of Article contributions. In other embodiments, External Users may have different levels of contribution, there may be no distinction between External Users and Internal Users, there may be other types of Users, etc.

User Types and User Subtypes may be combined. For example, Author and Reviewer may be the same person. As will be described further below, if they are the same person, there may be no separate Reviewer step in this embodiment. In other embodiments, as Author the person will interface with the system in one manner, and as Reviewer she will interface with the system in another manner. Of course, in other embodiments, there may be different—than those set out above—Content Types for different types of Content Providers, Editors and others.

In the especially preferred embodiments, there are a number of Content Types:
1) Website Documents.
2) Email.
3) Alerts. This Content Type is provided to end users who have configured their system to certain preferences, e.g., specific news about specific stocks.
4) Branded Content. This Content Type is, in the especially preferred embodiments, provided by a recognized authority or resource. For example, a message "From the Desk" of a recognized authority might be published or disseminated.

Each of these Content Types may be further subdivided as desired in various embodiments. For example, in the financial industry, certain Authors, Editors, etc. may be specialists in a certain financial instrument area. Therefore, there may be Content Type Sub Types which those specialists may access, such as a stocks Subtype of the Web Document Content Type, a bonds Subtype of the Email Content Type, etc. It should be noted that, in other embodiments, additional and/or other Content Types and/or SubTypes may be used as desired.

The following table, Table I, provides User Access Guidelines for Internal User Subtypes for the especially preferred embodiments. These Guidelines may be altered as desired. External Users, in contrast, have no Guidelines, but rather Access is determined on an Article to Article basis, as described further above.

TABLE 1

|  | Author | Reviewer | Editor | Approver |
|---|---|---|---|---|
| Website Documents | R/W | R/W | R/W | R/W |
| Email | R/W | R/W | NA | R/W |
| Alert | R/W | R/W | NA | R/W |
| Branded Content | R/W | R/W | NA | R/W |

R/W—Read/Write
NA—No Access

Figure 2:
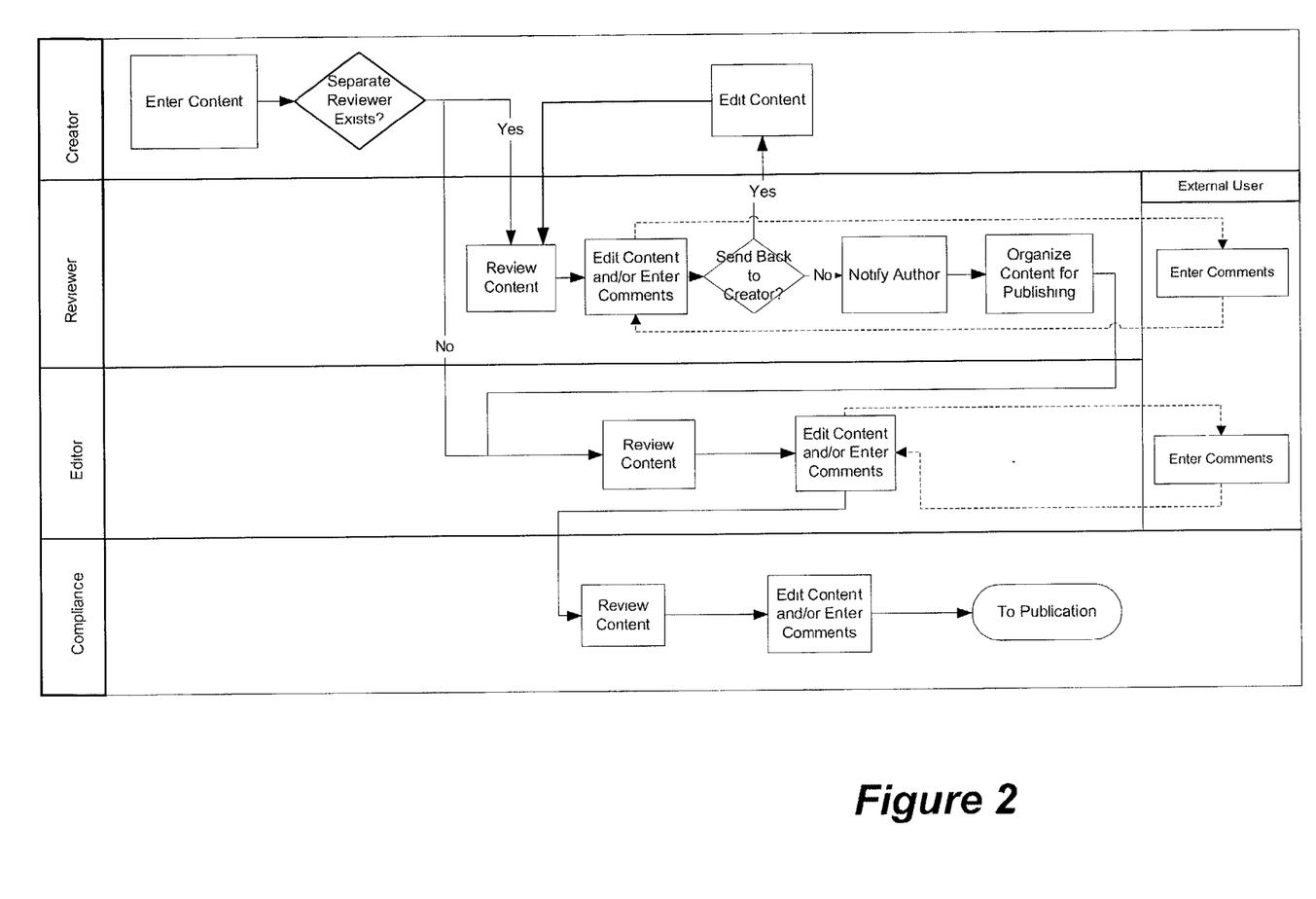
FIG. 2 shows a schematic diagram of a preferred embodiment.

FIG. 2 shows workflow for Website Document Content Type in an especially preferred embodiment. The workflow begins with the Creator entering content, a process that is described in further detail below. Each step in the process, e.g., Enter Content, Review Content, etc. is referred to herein as a Component Block. In other embodiments these separate Component Blocks depicted in the drawings could be altered, new Component Blocks created, etc.

Returning now to FIG. 2, if a separate Reviewer exists then the content is transmitted to the Reviewer who will review the content. As will be described further below, at each content transmission step between User Types, as well as within User Types, the status of the Article is updated on a Status Screen, as will be further described below. This updating provides tracking of the Article through the entire process. If multiple users are working on an Article simultaneously, such as more than one Author providing content for a Website document, more than one Reviewer reviewing content of a Website document, part of a Website document being created while another part edited, etc., the Status Screen will show the status of the Article as it proceeds through these multiple users.

The Reviewer ensures the content is appropriate and prioritizes the particular content. She will, as well, edit the content and/or enter comments about the content, and either send the content with comments back to the Creator or notify the Creator that the content will be published. The Reviewer then will make sure the content is properly organized, including organizing the content itself, and transmit the content onto the Editor. The Reviewer may, as well, as shown by the dotted line in the Figure, provide the content and/or comments to an External User who may review particular content and/or add particular comments. The External User will then return any comments to the Reviewer. (It should be noted that in certain preferred embodiments, any User Type may request information, that is, transmit content and/or seek comments from an External User during the workflow of any particular article.)

Once the content is sent to the Editor he will review the content, which includes ensuring consistent style among content, proofreading, and any necessary rewriting. The Editor may, as well, as shown by the dotted line in the Figure, provide the content and/or comments to an External User, who will subsequently return any comments to the Editor. The Editor will then transmit the content to an Approver who will again review the content for compliance with applicable regulations, policies and laws. The Approver will then send the content to publication.

Figure 3:
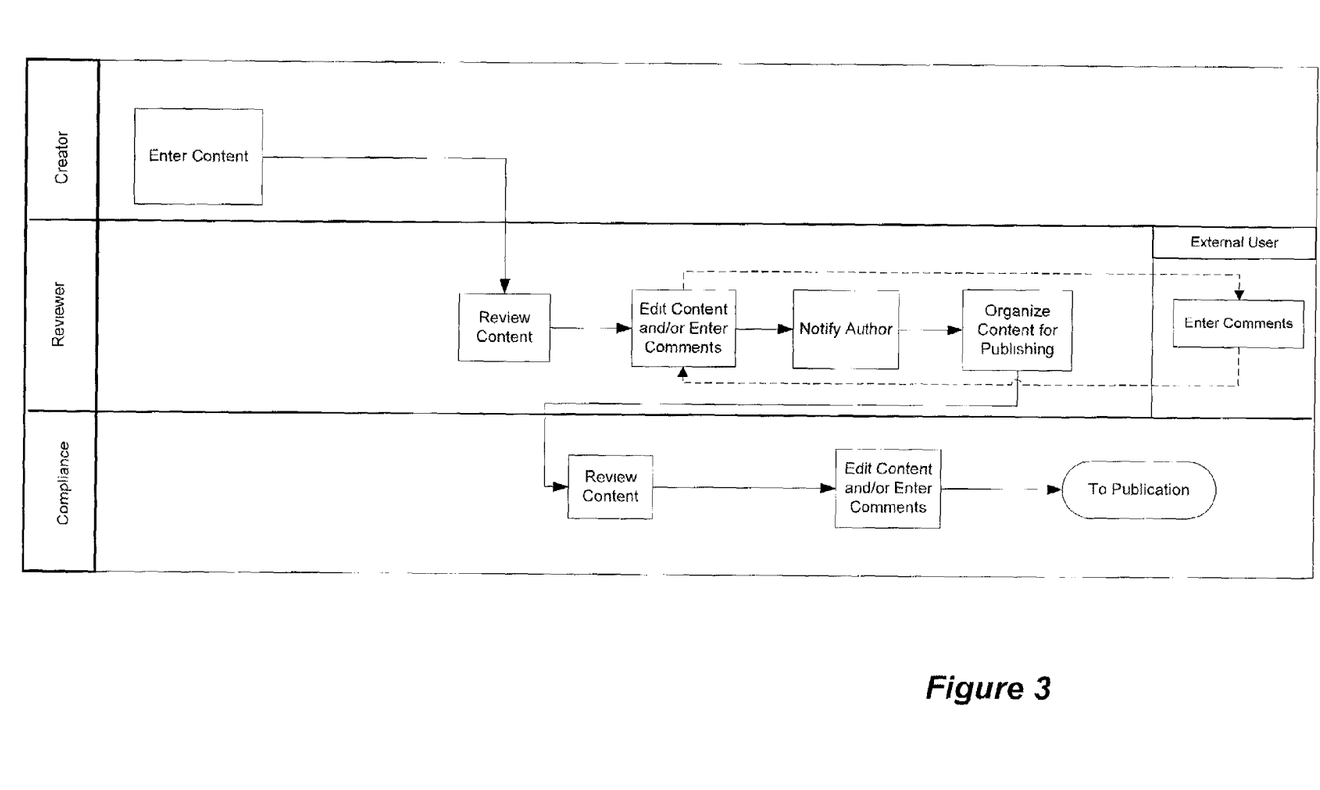
FIG. 3 shows a schematic diagram of a preferred embodiment.

FIG. 3 shows the workflow steps for Email and Alerts. Because of the especially timely nature of this content, there is no reverse flow, that is there is no return of the content to the Creator, and if the content cannot be made acceptable it is discarded, which path is not shown in the Figure. (Of course, in other embodiments, there could be reverse flow if desired.) Otherwise the steps shown are the same as those with the same name in the example of FIG. 2 described above.

Figure 4:
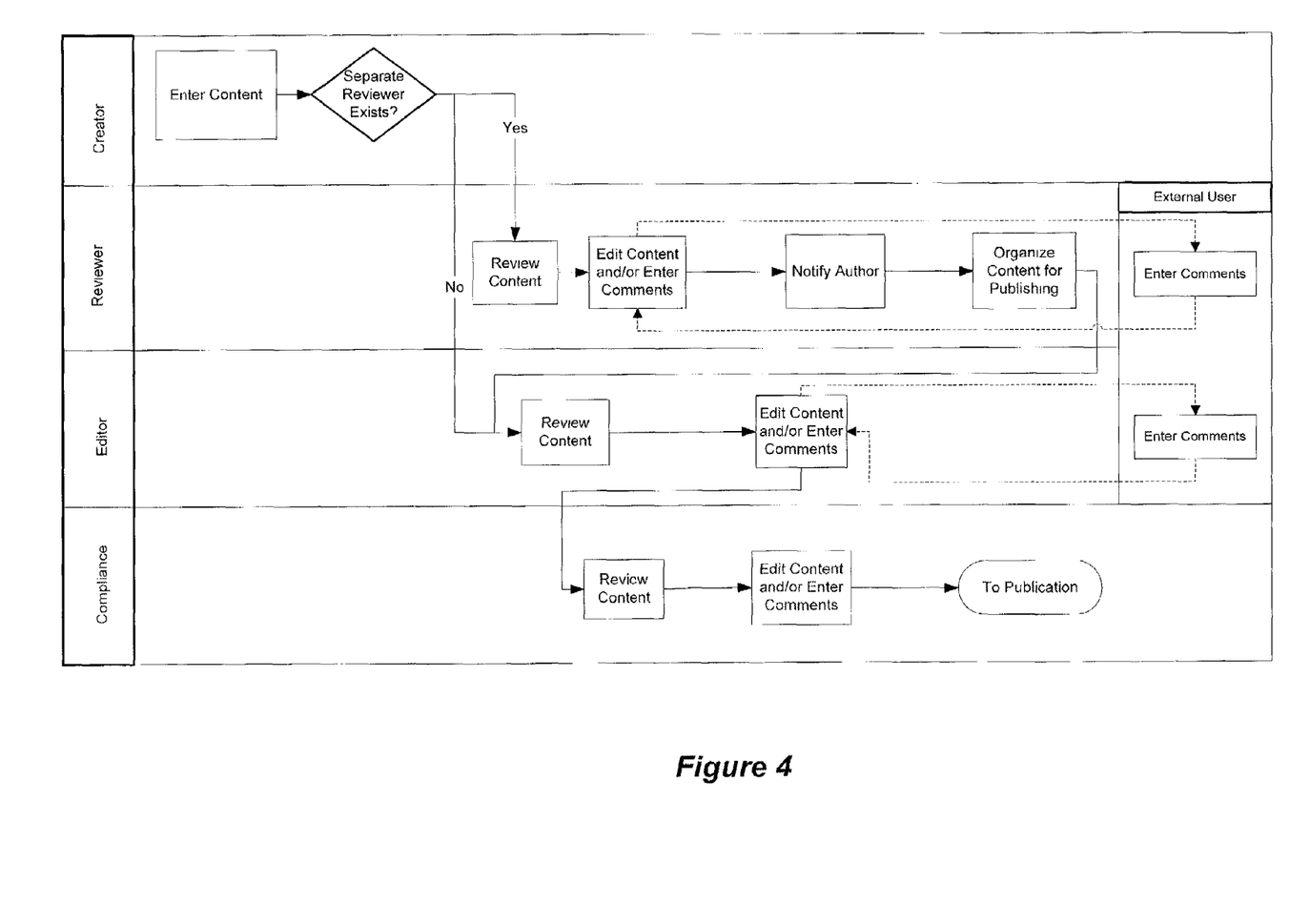
FIG. 4 shows a schematic diagram of a preferred embodiment.

FIG. 4 shows the workflow steps for Branded Content. In this workflow, the content is not returned to the Creator but will be published with the various changes made by the Reviewer, Editor and Approver. Otherwise the steps shown are the same as those with the same name in the example of FIG. 2 described above. The Review Requirements are the same as the User Access Guidelines. Those User Types that are required to review a particular Content Type are provided with access to those types.

As was described above, the Author and Reviewer may be the same person if desired. In such an instance, the tasks of Author and Reviewer may be performed simultaneously or nearly simultaneously in order to most efficiently proceed.

Of course, in other embodiments these processes may be changed, altered, modified, etc. as desired. For example, in order to maintain a rapid process, an Article, if it does not meet the Reviewer's standards, could be discarded rather than returned to the Author. As yet another example, new workflows could be created as desired "on the fly," that is as the need for a new workload is identified an administrator could create a new workflow through using component blocks, alter an existing workflow using component blocks, etc.

Additionally, in other embodiments, content may be created, review, edited, etc. simultaneously by more than one user. This would help maintain rapid flow of content. The specific component blocks could be divided as desired between various users.

Figure 5:
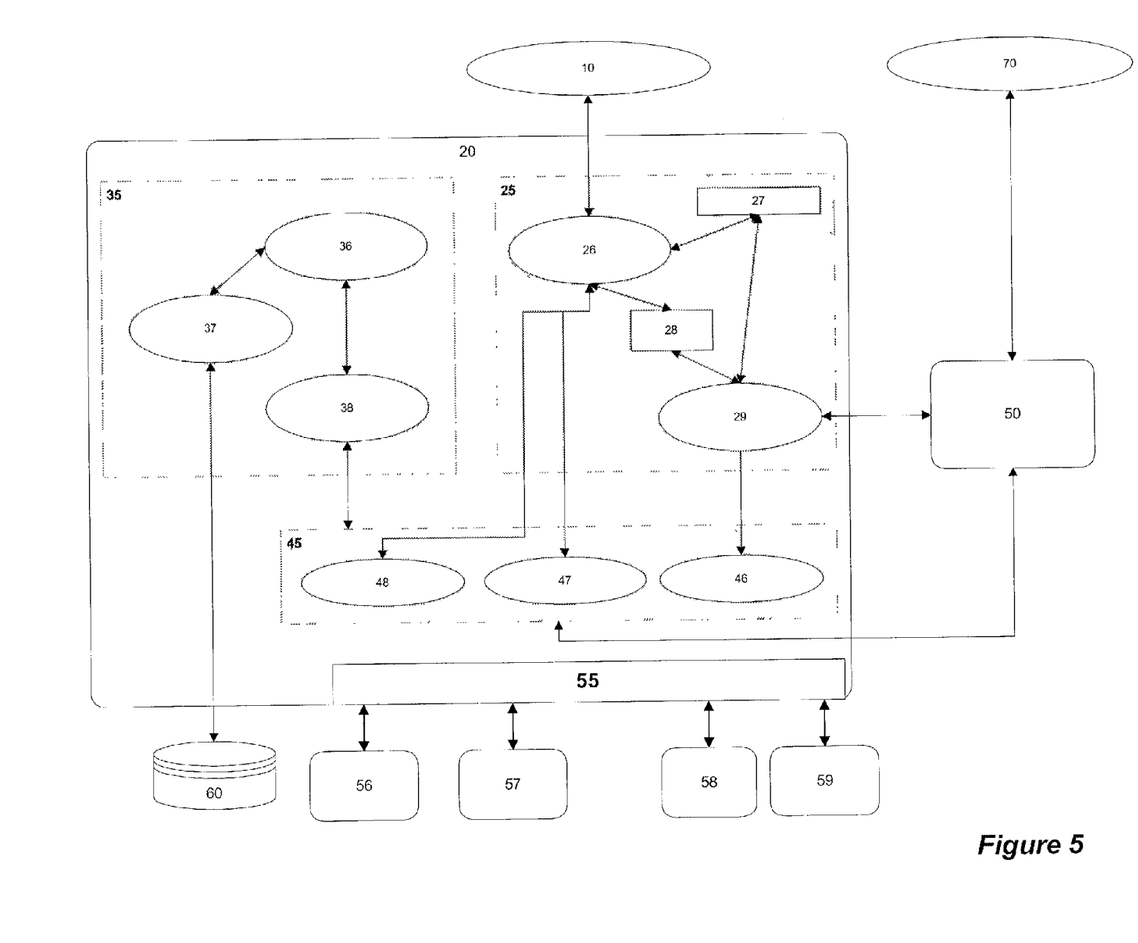
FIG. 5 shows a schematic diagram of a preferred embodiment.

Before proceeding to a more detailed description of certain of the steps described above, it might be helpful to review technical aspects of various embodiments. FIG. 5 shows the path through an especially preferred embodiment. This embodiment is constructed in Java® which is essentially a platform independent language. XML and HTTP, used for the data transfer, essentially provide a universal interface. Of course, other embodiments may be translated into other languages and use other data transfer interfaces. Therefore, the embodiments may be used across a wide variety of networked platforms.

The Internal User (of which there may be many but only one is shown here) is connected by way of User Machine 10 to Application Server 20 through a browser interface. The External User (of which there may be many but only one is shown here) is connected by way of User Machine 70 to External Messaging Application 50.

Present on Application Server 20 are two Containers, 25 and 35, as well as Worker Object Collection 45 and Messaging Objects 55 and Application Log (not shown.) Web Container 25 provides the interface infrastructure. Within Web Container 25, Controller Servlet 26 is the interface with the User's Machine. Controller Servlet 26 obtains access permissions and other configuration information from Configuration Component 27. Repository 28 is responsible for stored XML and XSL configuration and parameters. Servlet 29 provides an interface to Request Handler 46, which, in the preferred embodiments, directly communicates with an External Messaging Application 50 through HTTP transfer. Of course, in other embodiments, other mechanisms may be used to communicate with External Users, including data transfer through XML, EDI, etc.

User Machine 10 interacts with the Application Server 20 in the form of what is called hereinafter Article Items. The nature of an Article Item depends upon the user. An Article Item may be a single addition to or action upon an Article, or may be an entire Article, such as an entire Website document, email, etc. Enterprise JavaBeans Container 35 provides the components for Article Item transaction processing and control. Within Enterprise JavaBeans Container 35 are the Session Manager Component 36, responsible for the session about the Article Item, the Entity Beans Component 37, responsible for maintaining identification of the Article Items in Database 60, and Controller Session Beans Component 38, which is responsible for accessing, on user request and by way of Article Request Handler 48 and in turn Controller Servlet 26, any particular Article Item. Database 60 maintains an unique ID for Internal User Article Items that additionally maps to an unique ID set by External Messaging Application 50 for External User Article Items. The ID assists in assuring that content traveling through workflows and multiple workflows is properly identified and tracked as it proceeds through those workflows.

Worker Object Collection 45 comprises Request Handler 46, Request Handler 47, and Article Request Handler 48. Request Handler 46 provides an interface for User Machine 10 to External User Machine 70 (of which there may be many but only one is shown here) through, in this example, External Messaging Application 50.

Article items are provided to the External User, using HTTP, by way of Request Handler 47 which accesses Database 60 if necessary by way of Controller 26, Article Request Handler 48, etc. Article items may be, in some embodiments, requested by the External User, using HTTP, by way of External Messaging Application 50 and Servlet 29.

Messaging Objects 55 provide interfaces to Restricted Application 56, Client Coverage Application 57, Publishing Application 58 and Tagging Application 59. Restricted Application 56 through its own interface (not shown) maintains in a database (not shown) restricted lists which are used to check the tagged content against a restricted list before publication, and take appropriate action if the tagged content is on the restricted list. Client Coverage Application 57 through its own interface (not shown) maintains in a database (not shown) client lists which are used to provide alert type content of interest to clients. Publishing Application 58 through its own interface (not shown) maintains in a database (not shown) a central document repository for content. Tagging Application 59 through its own interface (not shown) maintains in a database (not shown) tags accessible by both internal and external users and content as will be further described below. These Tags, applied manually by users, or automatically to content, provide routing for content about topics in the tagging system, as is described further below.

Figure 6:
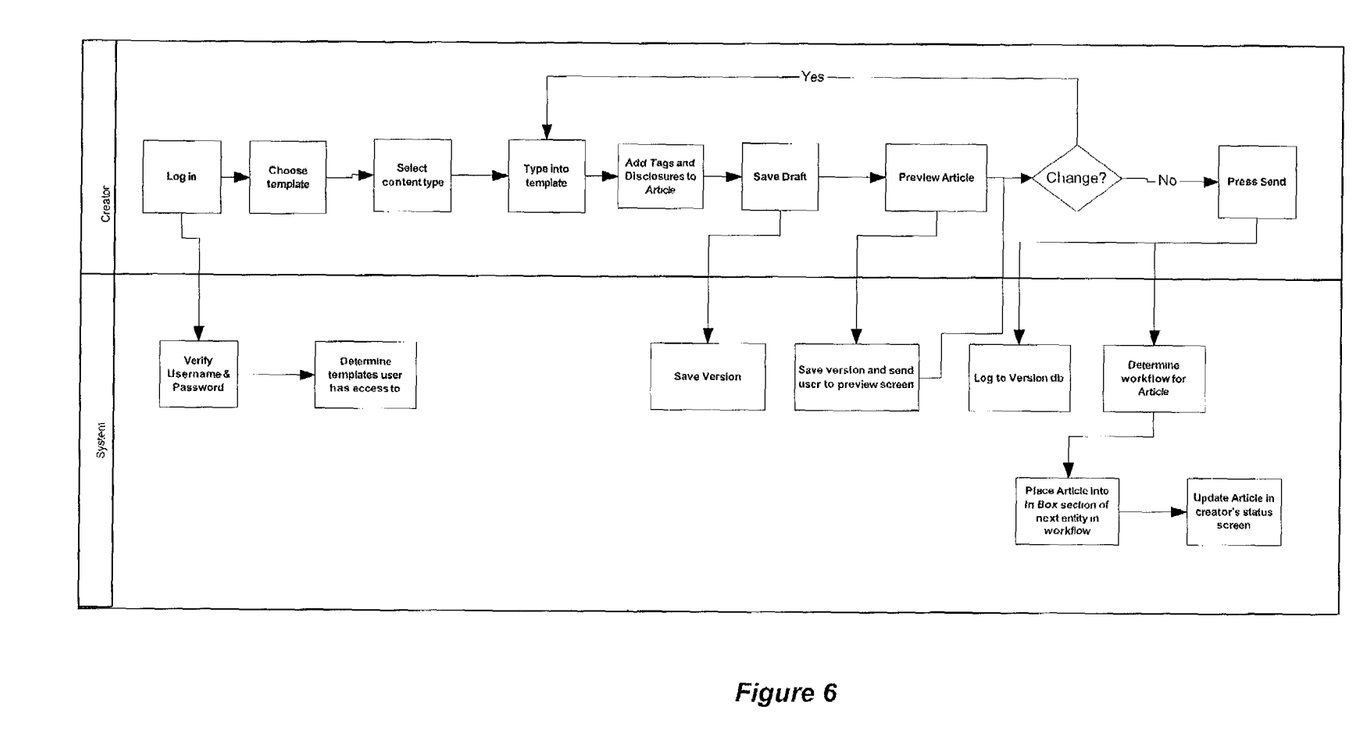
FIG. 6 shows a schematic diagram of a preferred embodiment.

Turning now to FIG. 6, a flow chart comprising Component Blocks in an especially preferred embodiment of an Enter Content process are seen. The Creator is responsible for content entry in this embodiment and the Figure illustrates a process of this embodiment for that entry. The Figure also illustrates the interface between the Creator and system as content is entered.

The Creator first logs into the system. The system determines the Creator's access rights based on the login. Those access rights limit Creator access to Content Type specific Templates. For example, Creator A may only be permitted to access Website document Templates, while Creator B may be permitted to access Website document Templates as well as email Templates. Of course, access rights may be predetermined as desired. For example, Creator access may be limited to subject specific templates, such as convertible bonds only. Once the Creator has been provided with authorized templates, he chooses among the available Content Type Templates.

The Creator's access is limited to preapproved Content Type specific Templates in this embodiment. Of course, in other embodiments a Creator may have access to all types. Moreover, if Content Types Subtypes exist, Creators do not usually provide content in all Subtypes of each Content Type. For example, a Creator may specialize in stocks or even more narrowly in high technology stocks, or even more narrowly, in specific stocks. In general, any desired degree of Creator specialization may be supported in the preferred embodiments, and, through use of preauthorized templates, Creator access is controlled.

The selected Content Type or Subtype Template provides appropriate formatting, etc. as will be described further below. Once the Creator accesses the Template, she proceeds to add content. As Creator adds the content, it is automatically tagged. Tagging provides informational flags once the content is published or disseminated, so that, for example, stock symbols, industry sectors and analyst names may be tagged, for quick access by later readers. Tags may be used as well to control publication or dissemination so that a reader who indicates interest in a particular stock will have all content with that stock symbol sent to her. Disclosures may be automatically added as well, for example, a disclosure that a Creator is writing about stock that he owns.

Tags are also used to disseminate content as it proceeds through the system. The Tags and Disclosures assist later Reviewers in finding and reviewing the content and ensuring appropriate laws, policies etc. are being met with regard to the content. For example, content with a particular stock symbol type may be sent to a particular Reviewer specializing in that particular stock. As another example, Tags provide an Approver with an automatic means of cross checking the content against a restricted list, that is against a list of stocks that have certain legal or policy guidelines imposed on content about that stock. As the Tags and Disclosures may already be present, such as when cutting and pasting a prior Article, the User may also modify and/or verify Tags and Disclosures, if desired. The User will also verify the appearance of the Article in the preview screen.

In this embodiment, tagging of symbols, sectors and analyst is automatic. Other Tags may be used as well in order to efficiently provide content. For example, Tags may be added based on a User Tag Rule. A User Tag Rule, predetermined by a User or another, provides automatic Tagging of Information as the User desires.

Additionally, a Creator may manually Tag information as well. In other embodiments, Tags may be used as desired, including providing predetermined Tags for automatic tagging, manual tagging, etc.

In the especially preferred embodiments, a Primary and/or Secondary Tag may be used. A Primary Tag is used to indicate an Article directly relates to the Tag. For example, the tag "MSFT" would be used as a Primary Tag indicating the Article is about Microsoft Corporation. A Secondary Tag is used to indicate the Article may contain information of interest. For example, "MSFT" used as a Secondary Tag indicates the Article may only contain indirect information about Microsoft Corporation, as might be the case when an Article is about UNIX® server market demand.

The Creator then saves her draft on the system and the system provides her with her draft for preview. She makes any changes, and forwards it to the appropriate Recipient(s). The appropriate Recipient is determined by the template, which in turn is controlled by the Content Type. In this embodiment, as was described above, the Content Type will determine the workflow. After determining the workflow, the system will place the content into an Inbox of the appropriate recipient. ("Inbox" as used herein is a general reference to an area on a user's system that receives communications, rather than any particular product's component named "Inbox.") The system will also update the Status Screen of the Creator, which is described in further detail below, and log the document in a versions database. This permits version tracking if subsequent changes are made.

Figure 7:
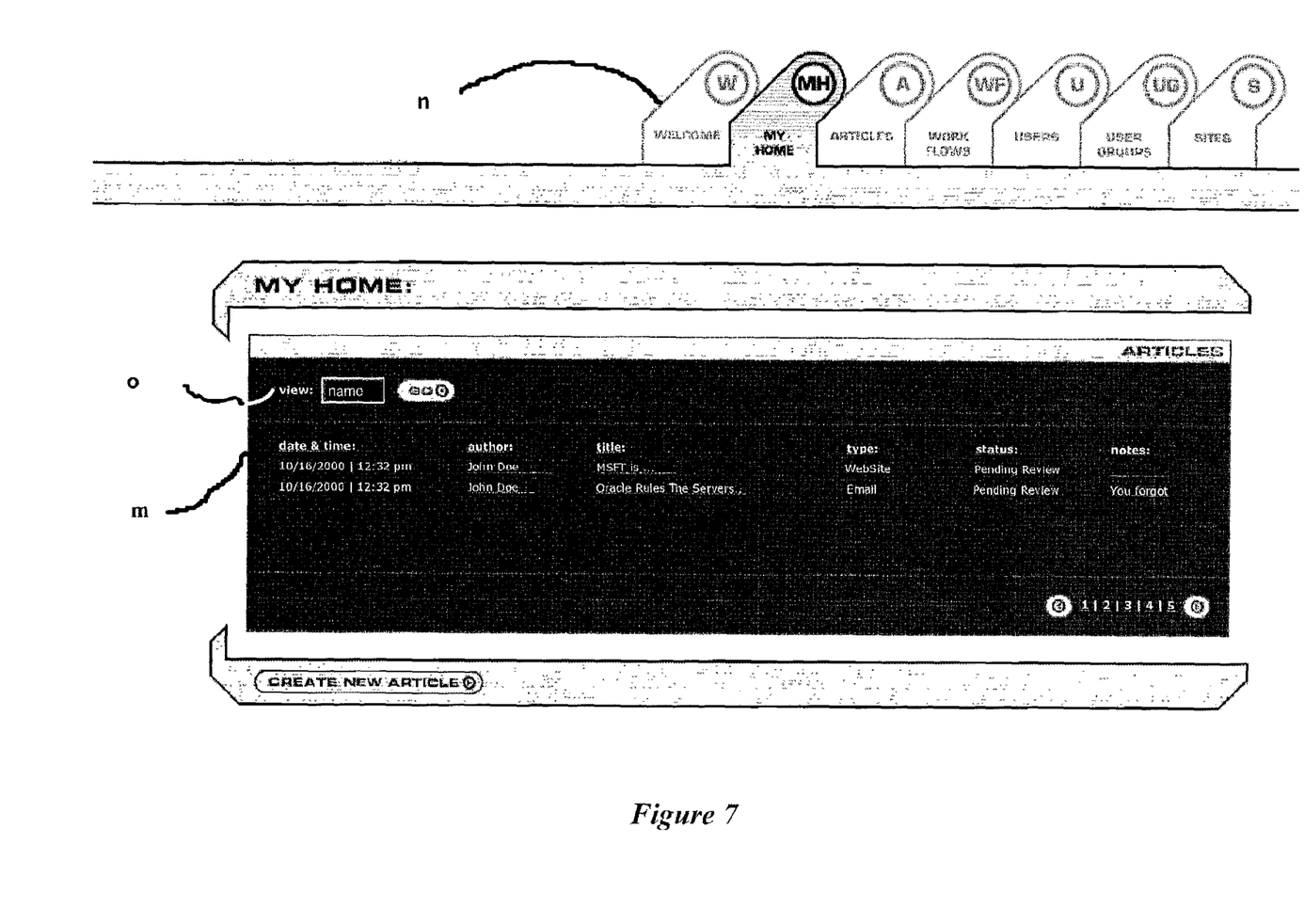
FIG. 7 shows a screen shot of an interface of a preferred embodiment.

Turning briefly to FIG. 7, an example of a Status Screen interface is seen. This status screen is also used for other users as well as Creators, as will be described in further detail below. At m is a list of the Creator's Articles. At n is seen a navigation bar, providing access, to the extent of the user's authority, to other pages throughout the system, which are described in further detail below. At o is a view field, providing authorized users with the ability to search for information. For example, a user might search for Articles by name, date, etc.

The tabs shown generally at n provide navigation as follows:

Welcome. The login screen.
My Home. The User's Home page, reached after login.
Articles. History, Editing and Preview pages for Articles in the workflow, including Templates for Articles.
Workflow. Management and Directory of Workflows through the system.
Users. Management of Users.
User Group. Management of User Groups.
Sites. A review of Publication status of Articles' status, Compliance status, Site Editing capabilities, and miscellaneous Article and Site Utilities. In certain preferred embodiments, this area contains a WYSIWYG area for previewing Articles and publishing Articles offsite.

Figure 8:
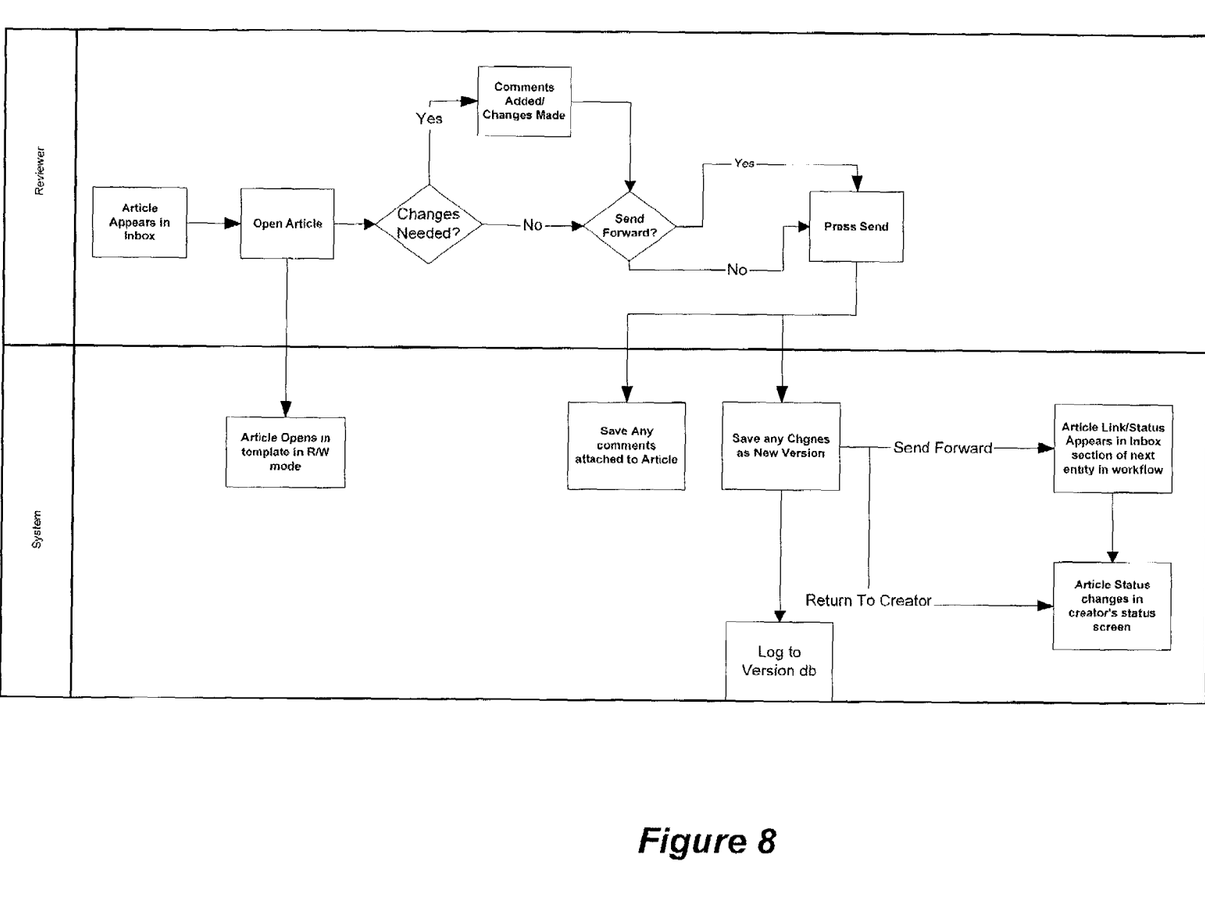
FIG. 8 shows a screen shot of a interface of a preferred embodiment.

Turning now to FIG. 8, a flow chart comprising Component Blocks in an especially preferred embodiment of a Review Content process are seen. As can be seen in the Figure the Reviewer will have the Article placed in his Inbox, from where he can click to open the Article. The system opens the Article with read/write access (also described as editing mode.) The Reviewer can then decide if changes or comments are needed, add any comments and/or changes to the Article and send the Article forward to the next entity. The version will be logged to the version database. If the Article cannot be transmitted further, it will be returned, or sent backwards to the Creator with any comments or changes. Comments may include comments to External Users, as well as notes to other Internal Users. The latter are displayed on the status screen for the users, as seen in the column labeled "Notes" in area m of FIG. 7. If the document is sent to the next user, it will appear in that user's Inbox. The status of the Article will be updated in the Creator's status screen as well.

Figure 9:
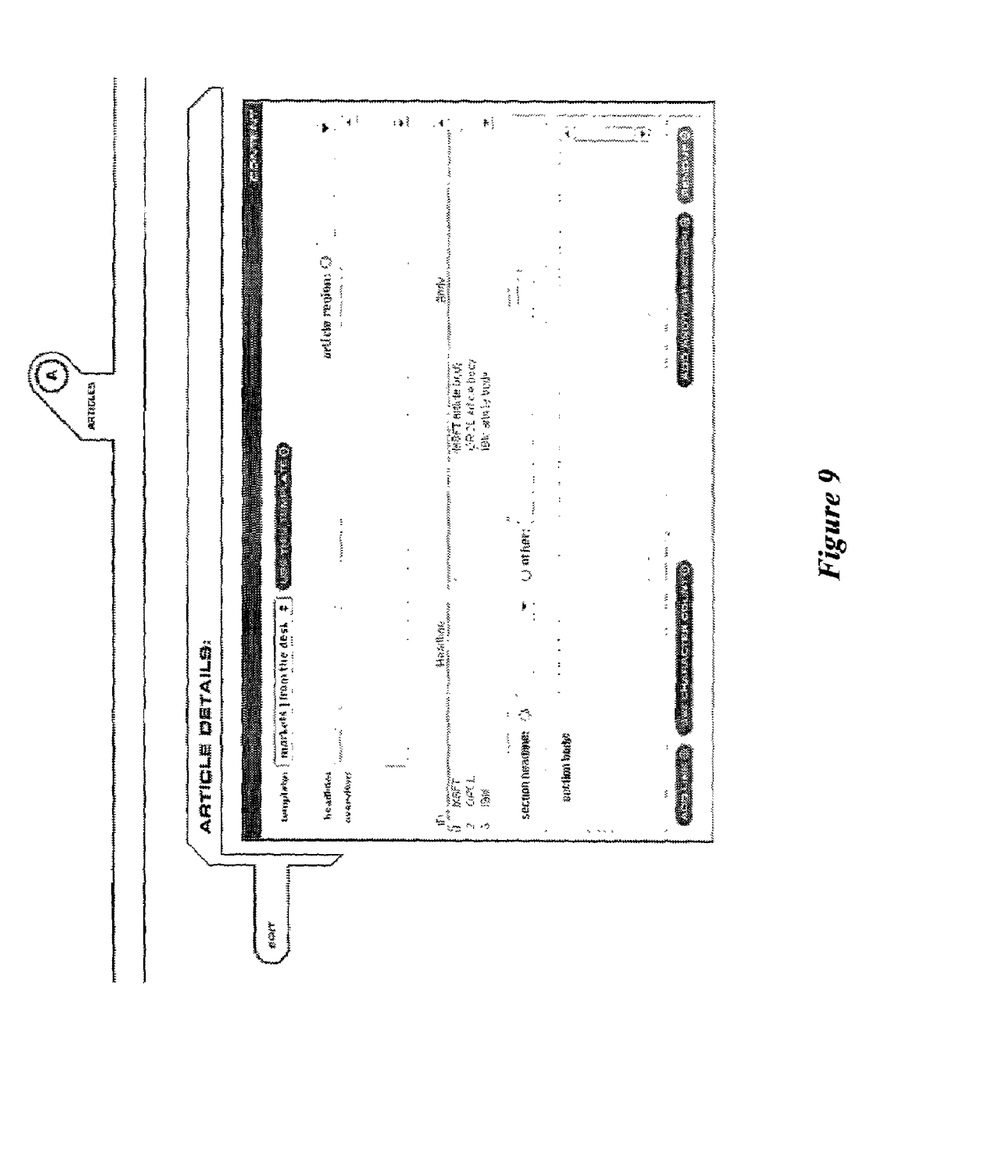
FIG. 9 shows a screen shot of an interface of a preferred embodiment.
Figure 10:
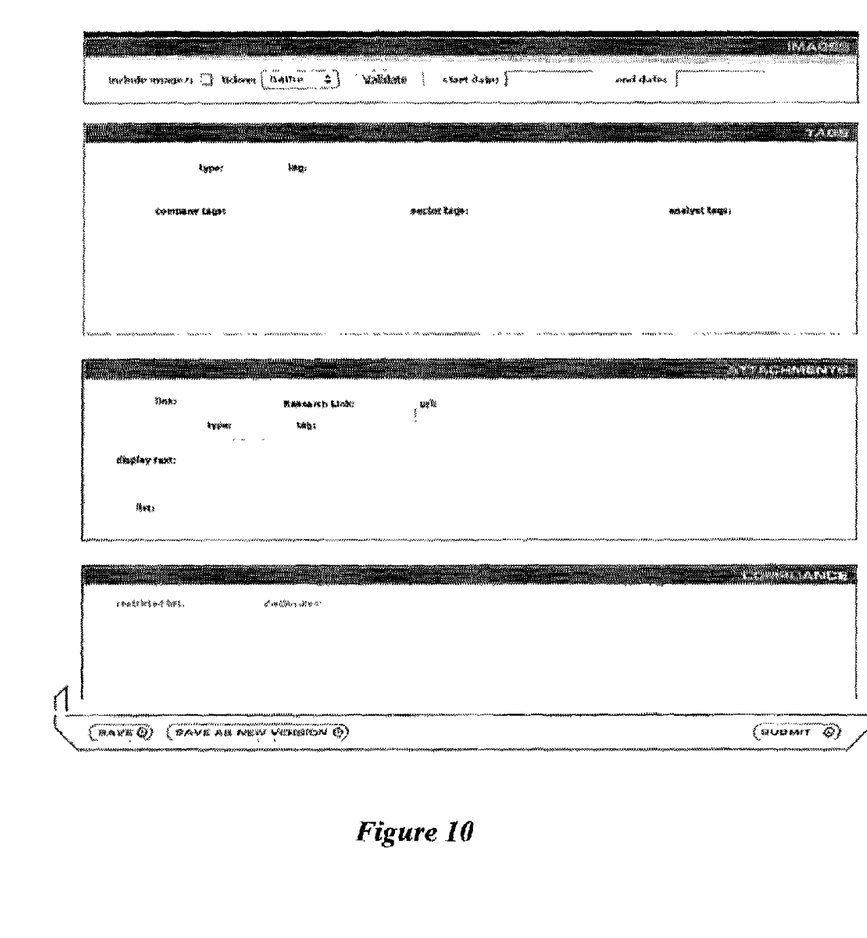
FIG. 10 shows a screen shot of an interface of a preferred embodiment.

FIGS. 9 and 10 are examples of Editing interfaces. Here the particular interface used is for a Branded Content Article, called here "From the Desk Of." The Article Headline, Overview, Section(s), and Section Body(s) are available to the User. The User can also Add Section(s), Link(s), Images and Tags, as desired. Other Content Types may have different Editing screens.

Once the workflow for the Article is Complete, as was described above, the Article is ready for publication or dissemination to Website e, Email f or Alert g. In certain preferred embodiments, publication is to a Web portal such as that described in U.S. application Ser. No. 09/796,570 entitled "COMPUTERIZED INTERFACE FOR MONITORING FINANCIAL INFORMATION AND EXECUTING FINANCIAL TRANSACTIONS" filed on Feb. 28, 2001 by Brian S. Brittingham and Thomas Jessop. In such a manner, the embodiments of the present invention serve as a content provider for Web portal. It should also be noted, however, that other preferred embodiments may publish to other types of interfaces, both on the Web or other interfaces, including email, Alerts, Instant Messaging, etc. as well as to devices including personal computers, terminals, personal digital assistants, cell phones, digital appliances, etc.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A method comprising:
    allowing a content creator to log into a system;
    providing a content type specific template to the content creator, the content type specific template being associated with a particular content type of a plurality of content types supported by the system;
    allowing the content creator to create a draft by using the content type specific template;
    selecting at least one of a reviewer and an editor from among a plurality of reviewers and editors accessible via the system, the selecting based at least in part on the content type specific template, the selected at least one of a reviewer and an editor being a user of the system; and transmitting the draft to an inbox of the selected at least one of a reviewer and an editor.

2. A method according to claim 1, further comprising:

allowing the content creator to select the content type specific template from among a plurality of content type specific templates supported by the system.

3. A method according to claim 2, wherein the plurality of content type specific templates includes a first template suitable for creating a website document, a second template suitable for creating an e-mail, a third template suitable for creating an alert, and a fourth template suitable for creating branded content.

4. A method according to claim 1, further comprising:

allowing the selected at least one of a reviewer and an editor to review the transmitted draft.

5. A method according to claim 1, further comprising:

applying a tag to the draft;

wherein the selecting the at least one of a reviewer and an editor is based at least in part on the tag applied to the draft.

6. A method comprising:

allowing a content creator to log into a system;

allowing the content creator to create a draft in the system;

applying a tag to the draft;

selecting at least one of a reviewer and an editor from among a plurality of reviewers and editors accessible via the system, the selecting based at least in part on the tag applied to the draft, the selected at least one of a reviewer and an editor being a user of the system; and transmitting the draft to an inbox of the selected at least one of a reviewer and an editor.

7. A method according to claim 6, wherein the system automatically applies the tag to the draft.

8. A method according to claim 6, wherein the content creator applies the tag to the draft.

9. A method according to claim 6, further comprising:

allowing the selected at least one of a reviewer and an editor to review the transmitted draft.

* * * * *

UNITED STATES PATENT AND TRADEMARK OFFICE
CERTIFICATE OF CORRECTION

PATENT NO. : 7,099,847 B2
APPLICATION NO. : 10/016289
DATED : August 29, 2006
INVENTOR(S) : Anne Marie Darling Page 1 of 1

It is certified that error appears in the above-identified patent and that said Letters Patent is hereby corrected as shown below:

On The Title Page:
Item (74) Attorney, Agent, or Firm should be:

Buckley, Maschoff & Talwalkar LLC

Signed and Sealed this

Thirty-first Day of October, 2006

JON W. DUDAS
*Director of the United States Patent and Trademark Office*